United States Patent
Kanno

[11] 3,882,576
[45] May 13, 1975

[54] HANGING STRAP FASTENER

[75] Inventor: Kyusei Kanno, Tokyo, Japan

[73] Assignee: Asahi Kogaku Kogyo Kabushiki Kaisha, Tokyo, Japan

[22] Filed: July 1, 1974

[21] Appl. No.: 484,707

[30]     Foreign Application Priority Data
         July 13, 1973   Japan.............................. 48-82409

[52] U.S. Cl.............. 24/265 R; 24/211 K; 354/288
[51] Int. Cl......................... A44b 17/00; A44c 5/18
[58] Field of Search........ 24/265 R, 265 SC, 265 H, 24/211 R, 211 K, 211 L; 354/288

[56]           References Cited
         UNITED STATES PATENTS
   966,544   8/1910   Heaton............................. 24/211 K
 1,447,440   3/1923   Stenman........................... 24/211 L
 2,723,430  11/1955   Paillard........................ 24/265 H X
 3,583,042   6/1971   Ishizaka........................... 24/265 R Primary Examiner—Donald A. Griffin
Attorney, Agent, or Firm—Christie, Parker & Hale

[57]           ABSTRACT

A fastener includes a pin and an assembly that is releasably attachable to the pin and rotatable thereabout. In use, the pin is affixed to the casing of a camera or the like with a portion of the pin projecting therefrom to define the axis of rotation. The assembly includes a ring to which a hanging strap is attachable for supporting the casing. With the assembly attached to the pin, two axially spaced-apart circular flanges on the projecting portion are each journaled in a respective one of two aligned holes in two similarly spaced-apart cover plates of the assembly. To facilitate attachment and release of the assembly when desired, the assembly includes slidable retaining means which is secured between the plates and movable between two positions that respectively retain the assembly in rotatable engagement and release it for easy removal.

2 Claims, 3 Drawing Figures

PATENTED MAY 13 1975  3,882,576

HANGING STRAP FASTENER

BACKGROUND OF THE INVENTION

This invention relates to a fastener for attaching a hanging strap to the casing of a camera or the like.

In the past, strap fasteners and other accessories have generally been attached to a camera body by hooking a lock member into a grooved member fixed to the side of the camera body. Various improvements have been made to such a strap fastener so as to enable convenient handling of the camera when the hanging strap is attached. With conventional fastener means, however, there are involved several disadvantages in that some compulsory force is applied to the fastener and/or an unnatural twisting occurs in the hanging strap when the hanging strap is curved in some undesirable directions with respect to the camera. Moreover, even if the camera is suspended in a normal position, these disadvantages manifest themselves when the strap fastener is wrongly oriented.

SUMMARY OF THE INVENTION

This invention is directed to a fastener arranged so as to overcome the foregoing and other disadvantages of conventional fastener means and thereby provide an improved hanging strap fastener which enables convenient handling of a camera or the like to which it is attached. The fastener of this invention includes a pin and an assembly that is releasably attachable to the pin and rotatable thereabout. The pin is attachable to a casing, advantageously that of a camera, so that an axially extending portion of the pin projects from the casing to define an axis of rotation. The axially extending portion includes first and second circular flanges that are axially spaced-apart to define therebetween a circumferential groove in the pin.

The assembly includes first and second plates, each of which has a hole. Interconnecting means, preferably including a plurality of spacers, provide for interconnecting the plates in facing, spaced-apart relationship with the hole aligned so that the flanges can be journaled therein. A strap ring has opposite ends that are held between the plates, preferably being secured therein through frictional engagement with the spacers. Significantly, the assembly includes slidable retaining means secured between the plates and movable between two positions in a direction transverse to the axis of rotation. These positions are an assembly retaining position and an assembly releasing position. The slidable retaining means includes a retaining flange portion that, while the slidable retaining means is in the retaining position, is disposed within the groove so as to cooperate with the first circular flange to act as a stop limiting translation of the assembly axially along the pin away from the casing. Means are provided such that, while the slidable retaining means is in the assembly releasing position, the slidable retaining means are biased to move into the assembly retaining position.

Preferably, the slidable retaining means includes a generally U-shaped plate oriented in a plane perpendicular to the axis of rotation. This U-shaped plate has on each opposite leg an outwardly tapered side edge portion. In the preferred embodiment, the biasing means includes means for acting against these side edge portions when the slidable retaining means is in the assembly releasing position. As a result, the legs of the U-shaped plate are compressed such that the U-shaped plate is resiliently urged to slide in a direction toward the assembly retaining position.

DETAILED DESCRIPTION OF THE INVENTION

Figure 3:
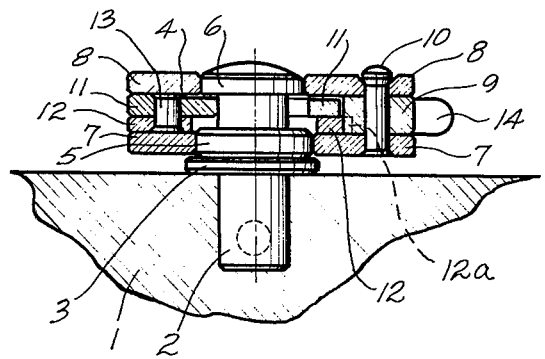
FIG. 3 is a sectional view showing the fastener, including a pin thereof, attached to a camera casing, with the section of the assembly being taken along the line 3'–3'' of FIG. 1.

In FIG. 3 there is shown a casing, preferably a camera body 1. A pin 2 is affixed in a recess in the camera body, and an axially extending portion of the pin projects outwardly from the camera body. This projecting portion includes two axially spaced-apart circular flanges 5 and 6 between which there is defined a circumferential groove 4. A circular spacer flange 3 is provided on the pin between the flange 5 and the portion of the pin occupying the recess.

In addition to such a pin, the fastener of this invention includes an assembly that is releasably attachable to the pin and rotatable thereabout. The assembly includes inner and outer cover plates 7 and 8, each of which has a hole. Interconnecting means, preferably comprising spacers 9 and rivets 10, interconnect the cover plates in facing, spaced-apart relationship with the holes aligned so that the circular flanges can be journaled therein.

The assembly includes slidable retaining means secured between the plates and movable in a direction transverse to the axis of rotation of the assembly. Preferably, the slidable retaining means including a lock plate 11 and a click plate 12, each of which is oriented in plane perpendicular to the axis of rotation. A rivet 13 interconnects these two plates so that they operate together as a slide member. As best shown in FIG. 2, the click plate is generally U-shaped thereby defining two opposite legs 12l, which border the sides of a generally arch-shaped open space. The lock plate 11 also has a hole 11h (FIG. 1), this hole being of slightly larger diameter than the circular flange 6 of the pin. As best shown in FIG. 3, a portion of the lock plate 11 serves as a retaining flange that, while the slidable retaining means is in the assembly retaining position, is disposed within the groove 4 so as to cooperate with the circular flange 6 of the pin to act as a stop limiting translation of the assembly axially away from the camera body 1.

The slide member is secured so as not to slip out of the space between the cover plates in that each of the legs has, among other things, a tab or projected portion 12a, that is positioned within a space defined between a pair of the spacers 9.

Figure 1:
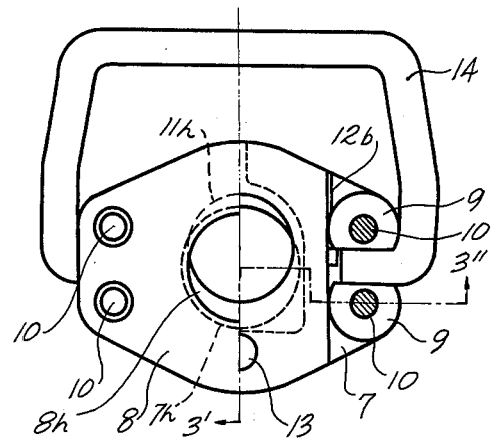
FIG. 1 is a view showing the preferred arrangement of the releasably attachable assembly of the fastener of this invention, with a portion of an outer cover plate not being shown, so as to expose interior elements as they are relatively positioned with respect to a lock or assembly retaining position.
Figure 2:
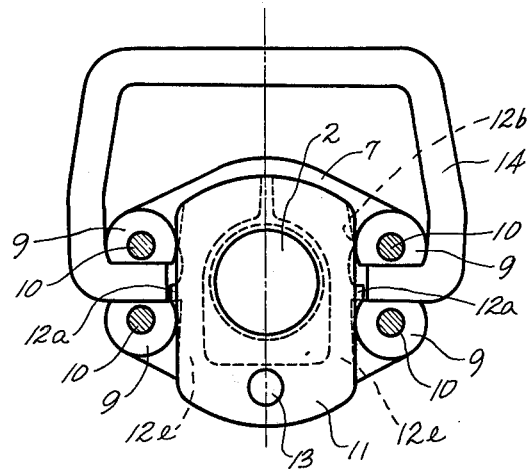
FIG. 2 is a view similar to FIG. 1 except that none of the outer cover plate is hown so as to expose pertinent features of the interior elements as they are relatively positioned with respect to a lock release or assembly releasing position.

The assembly provides for resiliently urging the slide member to move from the assembly releasing position (as illustrated in FIG. 2) to the assembly retaining position (as illustrated in FIGS. 1 and 3). To this end, the outer side edge of each of the legs 12*l* has, as best shown in FIG. 2, an outwardly tapered portion just above the tab such that each leg has a wide width portion 12b having a click function. This causes the click plate to be resiliently urged to move toward the assembly retaining position.

The assembly further includes a strap ring 14 to which a hanging strap (not shown) is attachable for supporting the camera body. In a small gap defined between the outer and inner cover plates and the two pairs of spacers 9, opposite end portions of the strap ring 14 are frictionally held in place.

With the foregoing construction, the lock plate 11 and click plate 12 operate together as an integral slide member. When moved to the position shown in FIG. 1, the slide member is arrested at a constant position relative to the cover plates by the projected portions 12a and the wide width portions 12b. Also, the above-mentioned flange portion of the lock plate 11 enters into the circumferential groove 4 of the pin 2. Thus, the rotatable assembly is attached to the pin and rotatable thereabout. The rotatable assembly is rotatable through 360° around the axis of the pin and the strap ring 14 is rotatable through 180° about a transverse axis.

When the slide member is translated by forcing it clickingly, the movement of the slide member is limited by contact of the projected portion 12a against the lower one of the spacers 9. When so limited at this position, the hole 11h formed in the center of lock plate 11 is aligned with the circular flange 6 of the pin 2. Under these conditions, inasmuch as the diameter of the hole 11h is larger than the diameter of the circular flange 6, the rotatable assembly can be separated from the retainer pin 2 by pulling out the rotatable assembly away from the camera body 1 and thus the hanging strap can be removed from the camera body. When no such external pull or push is applied, the slide member is resiliently urged as described above to return to the assembly retaining position.

With the strap fastener of this invention having the foregoing construction, when a camera or the like is suspended by a hanging strap attached to the strap ring 14, a gravitational force is applied to the center position between the outer and inner cover plates 7 and 8, but no unevenly distributed force is applied to the fastener at all. The entire assembly is freely rotatable with respect to the pin 2 and the strap ring 14 is pivotable symmetrically with respect to the pivoting axis passing through the center of the pin. The strap ring can be directed correctly with respect to the pulling force having any direction, and thus the danger of a compulsory force being applied to the strap ring and/or of the hanging strap being twisted can be eliminated. This permits convenient handling and use of the equipment to which this strap fastener is attached.

What Is Claimed is:

1. A fastener for attaching a hanging strap to a casing of a camera or the like, the fastener comprising a pin attachable to the casing so that an axially extending portion of the pin projects from the casing to define an axis of rotation, said axially extending portion including first and second circular flanges that are axially spaced apart to define therebetween a circumferential groove in the pin; and an assembly releasably attachable to the pin, the assembly including a. first and second plates each of which has a hole,
   b. means for interconnecting the plates in facing, spaced-apart relationship with the holes aligned so that the flanges can be journaled therein,
   c. slidable retaining means secured between the plates and movable in a direction transverse to the axis or rotation between assembly retaining and assembly releasing positions, the slidable retaining means including a retaining flange portion that, while the slidable retaining means is in the assembly retaining position, is disposed within the groove so as to cooperate with the first circular flange to act as a stop limiting translation of the assembly axially along the pin away from the casing,
   d. means operable while the slidable retaining means is in the assembly releasing position for biasing the slidable retaining means to move into the assembly retaining position, and
   e. a strap ring having opposite ends each of which is held between the pair of plates.

2. A fastener according to claim 1 wherein the slidable retaining means includes a generally U-shaped plate oriented in a plane perpendicular to the axis of rotation, the U-shaped portion having on each opposite leg an outwardly tapered side edge portion; and the biasing means includes means for acting against each side edge portion when the slidable retaining means is in the assembly releasing position so as to compress the legs of the U-shaped plate such that the U-shaped plate is resiliently urged to slide in a direction toward the assembly retaining position.

* * * * *